United States Patent
McNamara et al.

(10) Patent No.: US 12,235,864 B1
(45) Date of Patent: Feb. 25, 2025

(54) METHOD AND SYSTEM FOR AUTOMATED CLASSIFICATION OF NATURAL LANGUAGE DATA

(71) Applicant: JPMorgan Chase Bank, N.A., New York, NY (US)

(72) Inventors: Kevin J McNamara, Newfoundland, NJ (US); Rohit Talreja, Hyderabad (IN); Paul Oreto, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 18/367,746

(22) Filed: Sep. 13, 2023

(30) Foreign Application Priority Data

Jul. 31, 2023 (IN) .............................. 202311051406

(51) Int. Cl.
*G06F 16/25* (2019.01)
*G06F 16/28* (2019.01)
*G06F 40/20* (2020.01)

(52) U.S. Cl.
CPC .......... *G06F 16/258* (2019.01); *G06F 16/285* (2019.01); *G06F 40/20* (2020.01)

(58) Field of Classification Search
CPC ....... G06F 16/258; G06F 16/285; G06F 40/20
See application file for complete search history.

(56) References Cited

U.S. PATENT DOCUMENTS

| | | | |
|---|---|---|---|
| 11,756,093 B2* | 9/2023 | Aher ................. | G06Q 30/0269 705/7.29 |
| 11,768,843 B1* | 9/2023 | Du ...................... | G06F 16/9538 707/723 |
| 2012/0296887 A1* | 11/2012 | Jones .................... | G06Q 30/02 707/706 |
| 2016/0042069 A1* | 2/2016 | Lee-Goldman ....... | G06Q 50/00 707/706 |
| 2017/0068657 A1* | 3/2017 | Palmonari ............ | G06F 40/232 |
| 2023/0121287 A1* | 4/2023 | Buchmann ........... | G06F 16/907 707/756 |
| 2023/0143777 A1* | 5/2023 | Badjatiya ............ | G06F 16/9538 707/723 |
| 2023/0161949 A1* | 5/2023 | Yang ..................... | G06F 16/954 715/255 |
| 2023/0237085 A1* | 7/2023 | Jayanthi ................ | G06F 16/31 707/740 |
| 2023/0419183 A1* | 12/2023 | Purdy ................... | G06N 20/20 |
| 2024/0054282 A1* | 2/2024 | Baughman ........... | G06F 16/242 |
| 2024/0119058 A1* | 4/2024 | Springer ........... | G06F 16/24578 |

* cited by examiner

*Primary Examiner* — Etienne P Leroux
(74) *Attorney, Agent, or Firm* — Greenblum & Bernstein, P.L.C.

(57) ABSTRACT

A method for automatically classifying and tagging natural language data is disclosed. The method includes receiving, via an application programming interface, requests from various sources, each of the requests including raw data in a natural language format; converting the raw data into structured data sets; determining, by using a model, a metadata output for each of the requests based on the corresponding structured data sets; appending the metadata output to the corresponding requests; determining an action for each of the requests based on the corresponding metadata output; and automatically initiating the action.

20 Claims, 5 Drawing Sheets

METHOD AND SYSTEM FOR AUTOMATED CLASSIFICATION OF NATURAL LANGUAGE DATA

CROSS-REFERENCE TO RELATED APPLICATIONS

This application claims the benefit of Indian Provisional Patent Application No. 202311051406, filed Jul. 31, 2023, which is hereby incorporated by reference in its entirety.

BACKGROUND

1. Field of the Disclosure

This technology generally relates to methods and systems for classifying natural language data, and more particularly to methods and systems for facilitating automated classification and metadata tagging of natural language data in real-time by using artificial intelligence.

2. Background Information

Many business entities rely on various service platforms to provide support services for users and to manage issues related to numerous computing components. Often, these various service platforms aggregate user feedbacks such as, for example, service requests to facilitate identification of the issues. Historically, implementations of conventional classification techniques for the aggregated user feedbacks have resulted in varying degrees of success with respect to effective and resource efficient management of user requests.

One drawback of using the conventional classification techniques is that in many instances, the aggregates user feedbacks may include unstructured data in a natural language format. As a result, automated identification of the issues is inconsistent and resource intensive. Additionally, due to the inconsistencies, the service platforms may fail to correctly identify escalation opportunities and financial impacts related to incoming incident volume.

Therefore, there is a need for a classification solution that leverages artificial intelligence to facilitate automated classification and metadata tagging of natural language data in real-time to effectively and efficiently manage the user requests.

SUMMARY

The present disclosure, through one or more of its various aspects, embodiments, and/or specific features or sub-components, provides, inter alia, various systems, servers, devices, methods, media, programs, and platforms for facilitating automated classification and metadata tagging of natural language data in real-time by using artificial intelligence.

According to an aspect of the present disclosure, a method for automatically classifying and tagging natural language data is disclosed. The method is implemented by at least one processor. The method may include receiving, via an application programming interface, at least one request from at least one source, each of the at least one request may include raw data in a natural language format; converting the raw data into at least one structured data set; determining, by using at least one model, at least one metadata output for each of the at least one request based on the corresponding at least one structured data set; appending each of the at least one metadata output to the corresponding at least one request; determining at least one action for each of the at least one request based on the corresponding at least one metadata output; and automatically initiating the at least one action.

In accordance with an exemplary embodiment, the method may further include generating documentation for each of the at least one request, the documentation may include information that relates to at least one from among the at least one request, the at least one metadata output, and the at least one action; generating at least one graphical representation of the documentation, the at least one graphical representation may include a dashboard; and displaying the at least one graphical representation via a graphical user interface.

In accordance with an exemplary embodiment, the at least one request may include at least one from among a service request, a search request, and an incident request from the at least one source, the at least one source may include at least one from among a chat platform, a ticketing platform, and a client communication platform.

In accordance with an exemplary embodiment, to determine the at least one metadata output, the method may further include determining, by using the at least one model, at least one classification for each of the at least one request based on the corresponding at least one structured data set; determining, by using the at least one model, at least one predicted outcome for each of the at least one request based on the corresponding at least one structured data set; and determining, by using the at least one model, at least one characteristic for each of the at least one request based on the corresponding at least one structured data set.

In accordance with an exemplary embodiment, the at least one classification may include at least one from among an issue type classification, a root cause classification, a product classification, and a sentiment classification.

In accordance with an exemplary embodiment, the at least one predicted outcome may include at least one from among a predicted response time that is curated through historical response trained data and a predicted completion time that is curated through historical completion input trained data.

In accordance with an exemplary embodiment, the at least one characteristic may include at least one from among a clarity level, a privacy level, a feedback reinforcement rating, and a confidence score.

In accordance with an exemplary embodiment, to determine the at least one action, the method may further include determining at least one destination for each of the at least one request based on the corresponding at least one metadata output; determining an escalation factor for each of the at least one request based on the corresponding at least one metadata output and a predetermined guideline; and determining the at least one action based on the at least one destination and the escalation factor.

In accordance with an exemplary embodiment, the at least one model may include at least one from among a machine learning model, natural language processing model, a statistical model, a mathematical model, a process model, and a data model.

According to an aspect of the present disclosure, a computing device configured to implement an execution of a method for automatically classifying and tagging natural language data is disclosed. The computing device including a processor; a memory; and a communication interface coupled to each of the processor and the memory, wherein the processor may be configured to receive, via an application programming interface, at least one request from at least one source, each of the at least one request may include raw data in a natural language format; convert the raw data into at least one structured data set; determine, by using at least one model, at least one metadata output for each of the at least one request based on the corresponding at least one structured data set; append each of the at least one metadata output to the corresponding at least one request; determine at least one action for each of the at least one request based on the corresponding at least one metadata output; and automatically initiate the at least one action.

In accordance with an exemplary embodiment, the processor may be further configured to generate documentation for each of the at least one request, the documentation may include information that relates to at least one from among the at least one request, the at least one metadata output, and the at least one action; generate at least one graphical representation of the documentation, the at least one graphical representation may include a dashboard; and display the at least one graphical representation via a graphical user interface.

In accordance with an exemplary embodiment, the at least one request may include at least one from among a service request, a search request, and an incident request from the at least one source, the at least one source may include at least one from among a chat platform, a ticketing platform, and a client communication platform.

In accordance with an exemplary embodiment, to determine the at least one metadata output, the processor may be further configured to determine, by using the at least one model, at least one classification for each of the at least one request based on the corresponding at least one structured data set; determine, by using the at least one model, at least one predicted outcome for each of the at least one request based on the corresponding at least one structured data set; and determine, by using the at least one model, at least one characteristic for each of the at least one request based on the corresponding at least one structured data set.

In accordance with an exemplary embodiment, the at least one classification may include at least one from among an issue type classification, a root cause classification, a product classification, and a sentiment classification.

In accordance with an exemplary embodiment, the at least one predicted outcome may include at least one from among a predicted response time that is curated through historical response trained data and a predicted completion time that is curated through historical completion input trained data.

In accordance with an exemplary embodiment, the at least one characteristic may include at least one from among a clarity level, a privacy level, a feedback reinforcement rating, and a confidence score.

In accordance with an exemplary embodiment, to determine the at least one action, the processor may be further configured to determine at least one destination for each of the at least one request based on the corresponding at least one metadata output; determine an escalation factor for each of the at least one request based on the corresponding at least one metadata output and a predetermined guideline; and determine the at least one action based on the at least one destination and the escalation factor.

In accordance with an exemplary embodiment, the at least one model may include at least one from among a machine learning model, natural language processing model, a statistical model, a mathematical model, a process model, and a data model.

According to an aspect of the present disclosure, a non-transitory computer readable storage medium storing instructions for automatically classifying and tagging natural language data is disclosed. The storage medium including executable code which, when executed by a processor, may cause the processor to receive, via an application programming interface, at least one request from at least one source, each of the at least one request may include raw data in a natural language format; convert the raw data into at least one structured data set; determine, by using at least one model, at least one metadata output for each of the at least one request based on the corresponding at least one structured data set; append each of the at least one metadata output to the corresponding at least one request; determine at least one action for each of the at least one request based on the corresponding at least one metadata output; and automatically initiate the at least one action.

In accordance with an exemplary embodiment, when executed by the processor, the executable code may further cause the processor to generate documentation for each of the at least one request, the documentation may include information that relates to at least one from among the at least one request, the at least one metadata output, and the at least one action; generate at least one graphical representation of the documentation, the at least one graphical representation may include a dashboard; and display the at least one graphical representation via a graphical user interface.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
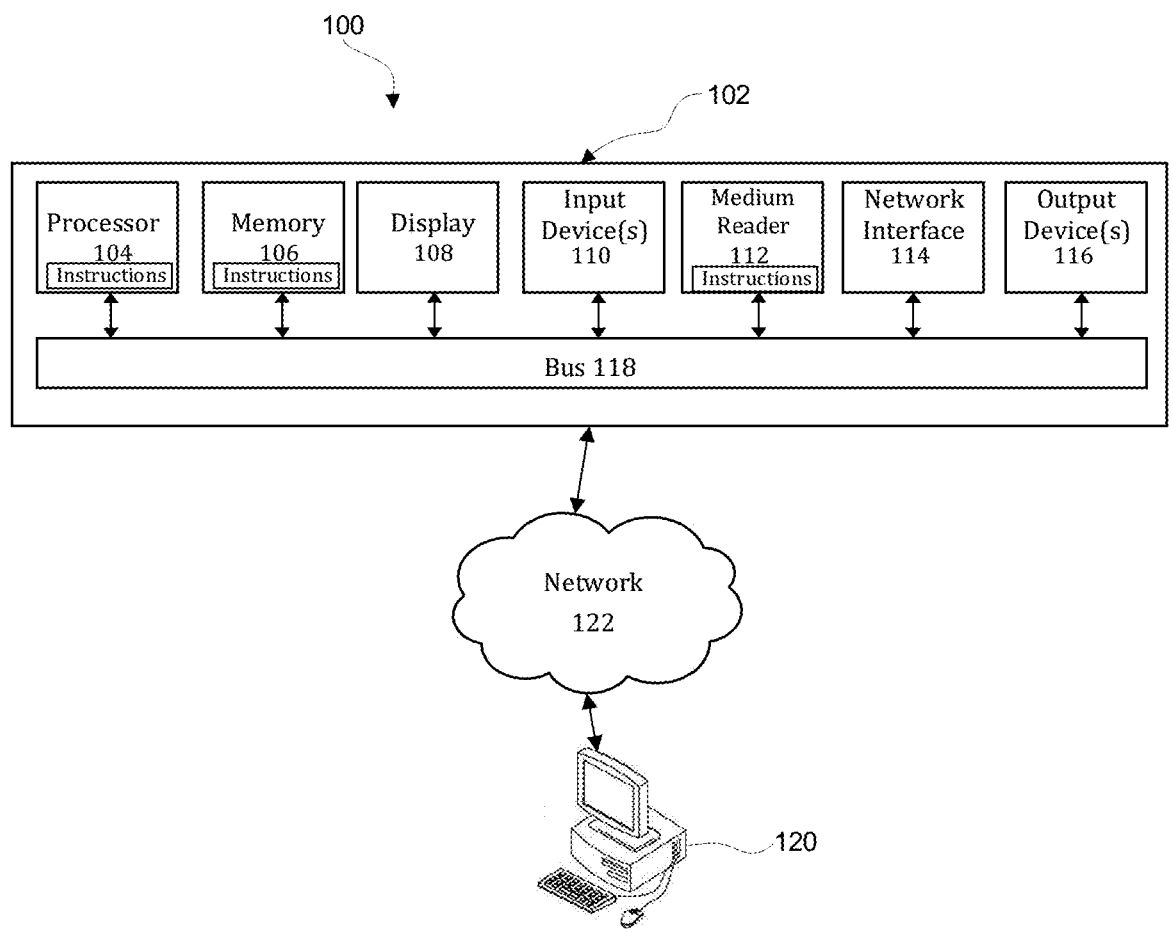
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automated classification and metadata tagging of natural language data in real-time by using artificial intelligence.

Figure 2:
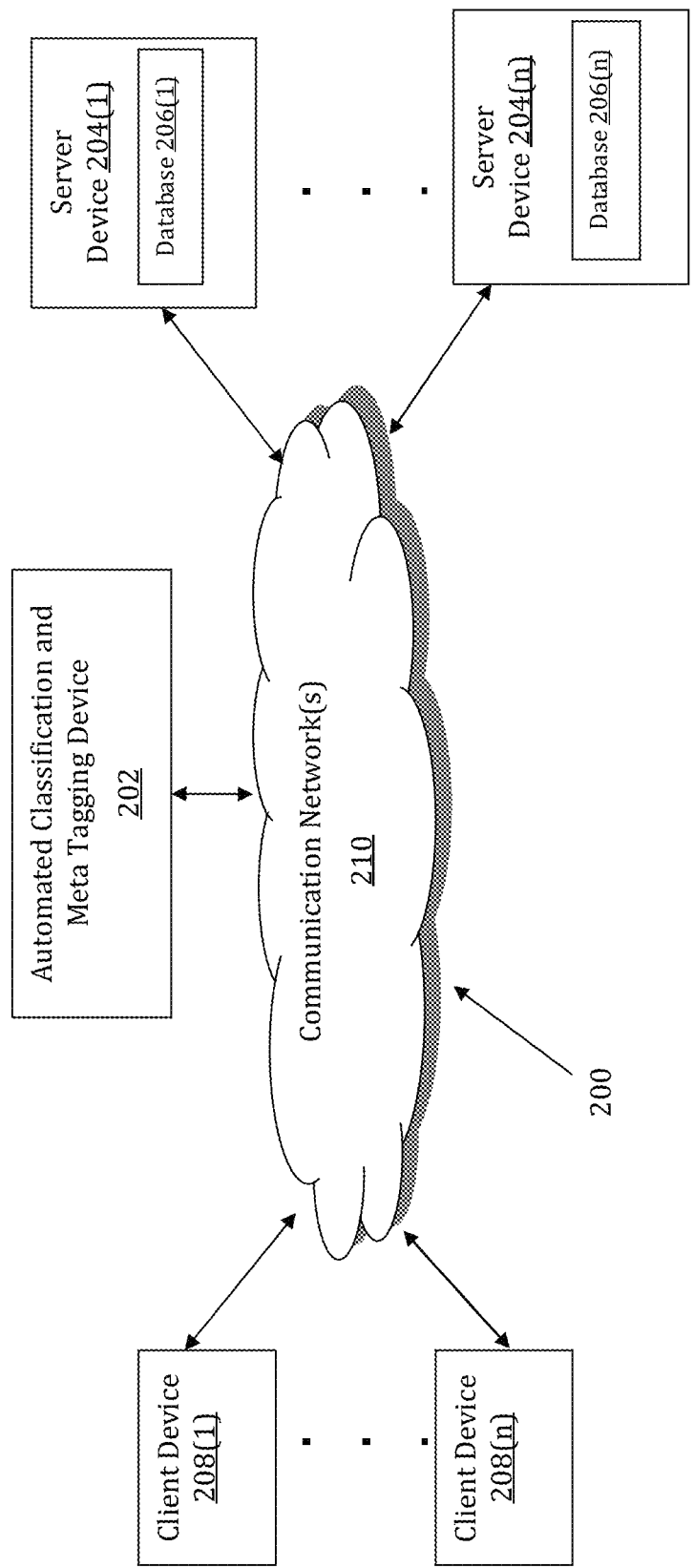
FIG. 2 illustrates an exemplary diagram of a network environment.

Referring to FIG. 2, a schematic of an exemplary network environment 200 for implementing a method for facilitating automated classification and metadata tagging of natural language data in real-time by using artificial intelligence is illustrated. In an exemplary embodiment, the method is executable on any networked computer platform, such as, for example, a personal computer (PC).

The method for facilitating automated classification and metadata tagging of natural language data in real-time by using artificial intelligence may be implemented by an Automated Classification and Meta Tagging (ACMT) device 202. The ACMT device 202 may be the same or similar to the computer system 102 as described with respect to FIG. 1. The ACMT device 202 may store one or more applications that can include executable instructions that, when executed by the ACMT device 202, cause the ACMT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ACMT device 202 itself, may be located in virtual server(s) running in a cloud-based computing environment rather than being tied to one or more specific physical network computing devices. Also, the application(s) may be running in one or more virtual machines (VMs) executing on the ACMT device 202. Additionally, in one or more embodiments of this technology, virtual machine(s) running on the ACMT device 202 may be managed or supervised by a hypervisor.

In the network environment 200 of FIG. 2, the ACMT device 202 is coupled to a plurality of server devices 204(1)-204(n) that hosts a plurality of databases 206(1)-206(n), and also to a plurality of client devices 208(1)-208(n) via communication network(s) 210. A communication interface of the ACMT device 202, such as the network interface 114 of the computer system 102 of FIG. 1, operatively couples and communicates between the ACMT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ACMT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ACMT devices that efficiently implement a method for facilitating automated classification and metadata tagging of natural language data in real-time by using artificial intelligence.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), or Ethernet-based Packet Data Networks (PDNs), combinations thereof, and the like.

The ACMT device 202 may be a standalone device or integrated with one or more other devices or apparatuses, such as one or more of the server devices 204(1)-204(n), for example. In one particular example, the ACMT device 202 may include or be hosted by one of the server devices 204(1)-204(n), and other arrangements are also possible. Moreover, one or more of the devices of the ACMT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ACMT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relate to requests, raw data in a natural language format, structured data sets, machine learning models, metadata outputs, actions, and documentations.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ACMT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ACMT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ACMT device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ACMT device 202, the server devices 204(1)-204(n), or the client devices 208(1)-208(n), for example, may be configured to operate as virtual instances on the same physical machine. In other words, one or more of the ACMT device 202, the server devices 204(1)-204(n), or the client devices 208(1)-208(n) may operate on the same physical device rather than as separate devices communicating through communication network(s) 210. Additionally, there may be more or fewer ACMT devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
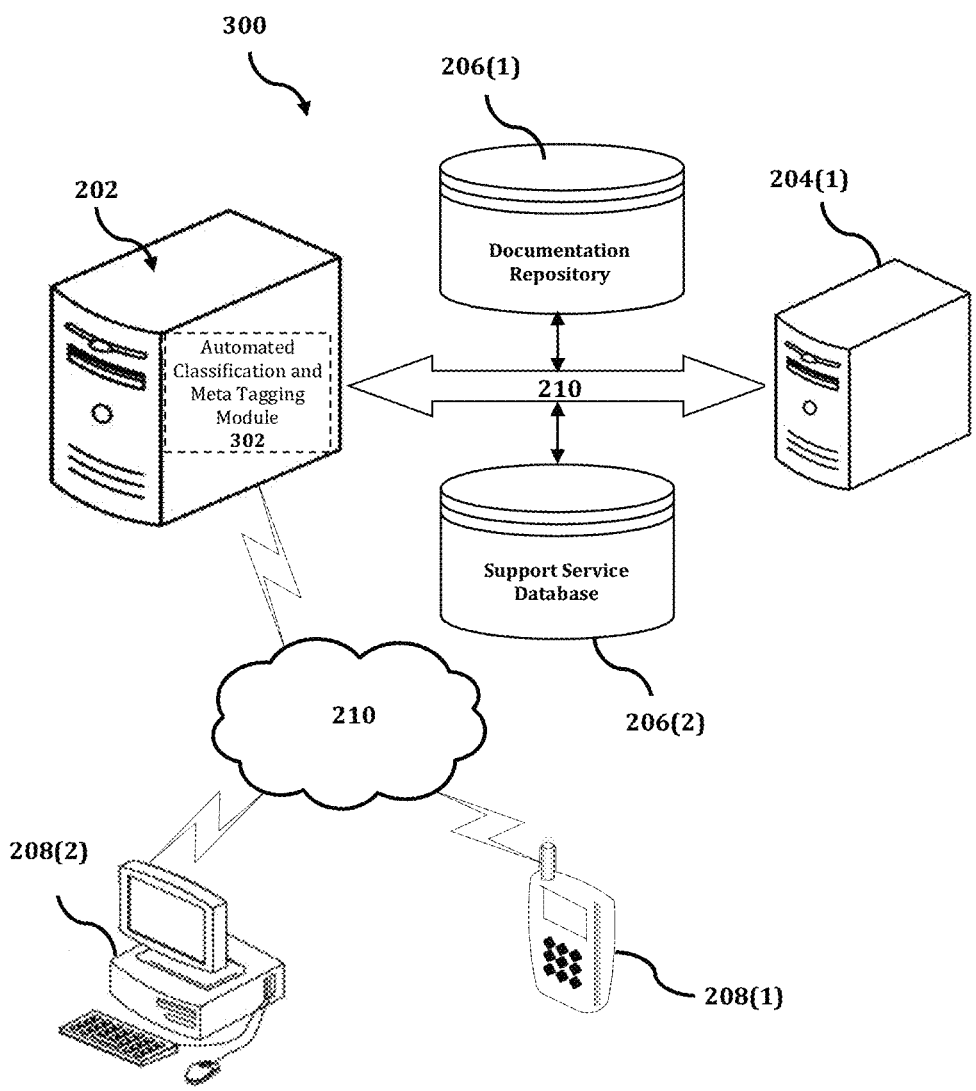
FIG. 3 shows an exemplary system for implementing a method for facilitating automated classification and metadata tagging of natural language data in real-time by using artificial intelligence.

The ACMT device 202 is described and shown in FIG. 3 as including an automated classification and meta tagging module 302, although it may include other rules, policies, modules, databases, or applications, for example. As will be described below, the automated classification and meta tagging module 302 is configured to implement a method for facilitating automated classification and metadata tagging of natural language data in real-time by using artificial intelligence.

An exemplary process 300 for implementing a mechanism for facilitating automated classification and metadata tagging of natural language data in real-time by using artificial intelligence by utilizing the network environment of FIG. 2 is shown as being executed in FIG. 3. Specifically, a first client device 208(1) and a second client device 208(2) are illustrated as being in communication with ACMT device 202. In this regard, the first client device 208(1) and the second client device 208(2) may be "clients" of the ACMT device 202 and are described herein as such. Nevertheless, it is to be known and understood that the first client device 208(1) and/or the second client device 208(2) need not necessarily be "clients" of the ACMT device 202, or any entity described in association therewith herein. Any additional or alternative relationship may exist between either or both of the first client device 208(1) and the second client device 208(2) and the ACMT device 202, or no relationship may exist.

Further, ACMT device 202 is illustrated as being able to access a documentation repository 206(1) and a support service database 206(2). The automated classification and meta tagging module 302 may be configured to access these databases for implementing a method for facilitating automated classification and metadata tagging of natural language data in real-time by using artificial intelligence.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ACMT device 202 via broadband or cellular communication. Of course, these embodiments are merely exemplary and are not limiting or exhaustive.

Upon being started, the automated classification and meta tagging module 302 executes a process for facilitating automated classification and metadata tagging of natural language data in real-time by using artificial intelligence. An exemplary process for facilitating automated classification and metadata tagging of natural language data in real-time by using artificial intelligence is generally indicated at flowchart 400 in FIG. 4.

Figure 4:
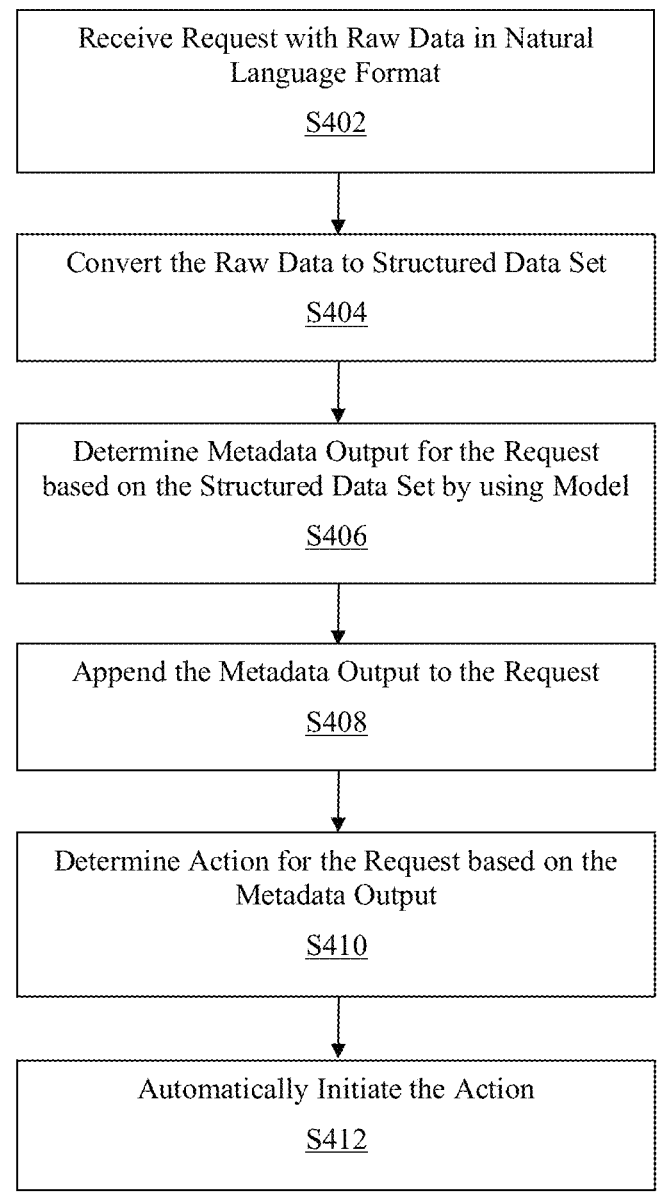
FIG. 4 is a flowchart of an exemplary process for implementing a method for facilitating automated classification and metadata tagging of natural language data in real-time by using artificial intelligence.

In the process 400 of FIG. 4, at step S402, requests may be received from a variety of sources via an application programming interface. Each of the requests may include raw data in a natural language format. In an exemplary embodiment, the requests that are received from the various sources may include at least one from among a service request, a search request, and an incident request.

The service request may relate to a formal requisition from an end user to a service provider for services that are necessary to facilitate system operations. The service request may be made to fulfill a need of the end user. Alternatively, the incident request may relate to a formal requisition to resolve a specific incident. The specific incident may correspond to events that result in interruption, degradation, and/or failure of various system components and functionalities. Likewise, the search request may relate to a formal requisition to identify information from a corpus of data. The identification of information from the corpus may facilitate additional processes such as, for example, extraction of the identified data from the corpus. Consistent with present disclosures, the requests may relate to any requests for support services as well as any requests for search services.

In another exemplary embodiment, the various sources may correspond to upstream applications that are configured to provide data to the disclosed invention. The sources may include at least one from among a chat platform, a ticketing platform, and a client communication platform. In another exemplary embodiment, the various sources may provide data to the disclosed invention via an application programming interface (API) such as, for example, a representational state transfer (RESTful) API, a chat API, or a socket API. The API may relate to a computing interface that enables two or more computer programs to communicate with each other. The API may serve as a software intermediary and/or an intermediary layer that processes data transfers between systems to allow different applications to talk to each other. The API may include a set of defined rules and protocols that enable the different applications to communicate.

In another exemplary embodiment, the raw data may relate to data that have not been processed for use such as, for example, source data, atomic data, or primary data. The raw data may not have been processed, coded, formatted, and/or analyzed for useful information prior to ingestion by the disclosed invention. Consistent with present disclosures, structured data such as, for example, preprocessed data may also be received by the disclosed invention from the various sources.

In another exemplary embodiment, natural language data may relate to a data format that reflect human languages, which have evolved naturally in humans through use and repetition without conscious planning or premeditation. The natural language data may exist in different forms such as, for example, as articulated sound data from a telephonic conversation and textual data from a chat conversation. The natural language data may be distinguishable from constructed and formal languages such as those used to program computing systems.

In another exemplary embodiment, the upstream applications may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the raw data may be converted into structured data sets. In an exemplary embodiment, the conversion of the raw data into structured data sets may relate to a process that transforms raw data into a meaningful output. Transformation of the raw data may be facilitated by various processing tools such as, for example, optical character recognition tools and natural language processing tools consistent with present disclosures. The transformation process may include extraction of data as well as structuring of the extracted data. For example, the transformation process may require initial extraction of texts from a document such as a service ticket. Similarly, the transformation process may require initial extraction of texts from an audio source such as a phone call. After extraction, the texts may be structured into a format that enables ingestion by a machine learning model.

At step S406, metadata outputs for each of the requests may be determined based on the corresponding structured data sets. The metadata outputs may be determined by using a model. In an exemplary embodiment, the metadata outputs may include data that provides information about one or more aspects of a collection of data such as, for example, the requests. The metadata outputs may be usable to summarize basic information about the collection of data that can make tracking and working with the collection of data easier. The metadata outputs may correspond to various types of metadata such as, for example, descriptive metadata, structural metadata, administrative metadata, reference metadata, and statistical metadata.

In another exemplary embodiment, to determine the metadata outputs, various classifications may be determined for each of the requests based on the corresponding structured data set. The classifications may be determined for each of the requests by using the model. The classifications may include at least one from among an issue type classification, a root cause classification, a product classification, and a sentiment classification. The sentiment classification may relate to a type of sentiment expressed such as, for example, a happy sentiment or an angry sentiment as well as a sentiment level such as, for example, extreme agitation or apathetic indifference. For example, sentiment classification of an incident ticket may indicate that a user is extremely frustrated that a certain computing component is nonfunctional.

Further, to determine the metadata outputs, various predicted outcomes may be determined for each of the requests based on the corresponding structured data set. The predicted outcomes may be determined for each of the requests by using the model. The predicted outcomes may include at least one from among a predicted response time that is curated through historical response trained data and a predicted completion time that is curated through historical completion input trained data.

The predicted response time may relate to a predicted time period that is appropriate for responding to the requests according to a guideline such as for example, a business guideline and a regulatory guideline. For example, the business guideline may indicate that immediate response is required for requests relating to computing components that are integral for providing services to customers. Moreover, the predicted completion time may relate to a predicted time period that is appropriate for resolving issues in the requests according to the guideline. For example, the business guideline may indicate that a high priority issue must be resolved within one business day.

Additionally, to determine the metadata outputs, various characteristics may be determined for each of the requests based on the corresponding structured data set. The characteristics may be determined for each of the requests by using the model. The characteristics may include at least one from among a clarity level, a privacy level, a feedback reinforcement rating, and a confidence score.

The clarity level may provide information on how clear or unclear the corresponding requests are. The clarity level may be usable to determine whether additional information is required from a user to process the requests consistent with present disclosure. For example, a low clarity level may be determined for incomplete requests that merely provide for a nonfunctional component. A subsequent action to request additional information such as, for example, what aspect of the component is nonfunctional, may be determined.

The feedback reinforcement rating may provide information on a feedback reinforcement value of the requests to the model. The feedback reinforcement rating may be usable to determine whether the requests are necessary to further reinforce a feature of the model. The feature, as used in machine learning and pattern recognition, may relate to an individual measurable property and/or trait of a phenomenon. The confidence score may provide information relating to how much confidence the model has in a predictive output. The confidence score may be calculated as an evaluation standard for the predictive output. The confidence score may represent a probability that the predictive output is accurate.

In another exemplary embodiment, the model may include at least one from among a natural language processing model, a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S408, the metadata outputs may be appended to the corresponding requests. In an exemplary embodiment, appending the metadata outputs to the corresponding requests may relate to a metadata tagging process. The metadata tagging process may associate the metadata outputs with the corresponding requests. The metadata outputs may be externally associated with the corresponding requests as well as internally integrated with the corresponding requests. For example, the externally associated requests and metadata outputs may be linked but persisted as separate files. In another example, the internally integrated requests and metadata outputs may be incorporated into a single file.

At step S410, actions for each of the requests may be determined based on the corresponding metadata outputs. In an exemplary embodiment, the actions may relate to a process and/or a sequence of steps that are necessary to resolve issues in the requests as provided for in the corresponding metadata outputs. The actions may include specific instructions that are essential for various computing components to implement the process and/or the sequence of steps. Consistent with present disclosures, the actions for each of the requests may be automatically determined without additional user input.

In another exemplary embodiment, to determine the action, a destination for each of the requests may be determined. The destination may be determined based on the corresponding metadata outputs. The destination may relate to a downstream application that is configured to receive the classified and metadata tagged requests. For example, the determined destination for a service ticket may include a support service platform.

Then, an escalation factor for each of the requests may be determined. The escalation factor may be determined based on the corresponding metadata output and a predetermined guideline. The escalation factor may relate to a criticality of the issues in the requests as determined based on tagged metadata and the predetermined guideline. For example, the escalation factor may be usable to identify how important the issues are based on how the issues are defined in the predetermined guideline. Consistent with present disclosures, the predetermined guideline may include at least one from among a business guideline and a regulatory guideline.

Finally, the action may be determined based on the destination and the escalation factor. The action may be automatically determined without additional user input. Consistent with present disclosures, the automatically determined action may facilitate automated data driven decisioning. For example, the actions may be automatically determined to escalate critical requests as well as to send the critical requests to appropriate service components for effective resolution.

At step S412, the determined actions may be automatically initiated. In an exemplary embodiment, the automatic initiation of the determined actions may relate to a triggering of the process and/or the sequence of steps that are necessary to resolve issues in the requests. The determined actions may be automatically initiated without additional user input.

In another exemplary embodiment, the determined actions may include a verification action that governs the automatic initiation. The verification action may be initiated prior to the triggering of the process and/or the sequence of steps to request approval. For example, a verification action may be initiated to request approval from an administrator prior to initiating the determined resolution actions. The verification action may be determined for each of the requests based on the corresponding metadata output and a predetermined guideline such as, for example, a business guideline and a regulatory guideline. For example, the predetermined guideline may require verification by an administrator prior to initiating resolution actions for components that have been tagged as critical.

In another exemplary embodiment, documentation for each of the requests may be generated. The documentation may include information that relates to at least one from among the requests, the metadata outputs, and the actions. The documentation may relate to informational material such as, for example, a log that serves as a record of events that occur in a computer system. The informational material may detail problems, errors, and/or system operations. The informational material may be usable to monitor and understand the operation of the system and/or debug identified problems. For example, the documentation may include information such as a predicted time to respond to the requests as well as the actual time that it took a service representative to respond to the requests. The documentation may be usable to track performance of a service component such as, for example, a help desk.

Then, graphical representations of the documentation may be generated. The graphical representation may relate to visually displaying data through various visualization tools such as, for example, graphs, diagrams, charts, and plots. The graphical representation may assist in sorting, visualizing, and presenting data in a clear manner. For example, the graphical representations may visualize the performance of a service component such as a help desk to facilitate automated data driven decisioning.

Consistent with present disclosures, the graphical representations of the documentation may serve to visualize documentation data as well as process the documentation data to provide additional insight. For example, the graphical representation may include a type of graphical user interface such as a data dashboard that provides at-a-glance views of various metrics. The data dashboard may summarize different, but related data sets, for presentation is a way that makes the related information easier to understand. The generated graphical representation may be displayed via a graphical user interface to facilitate various services such as, for example, support services.

Figure 5:
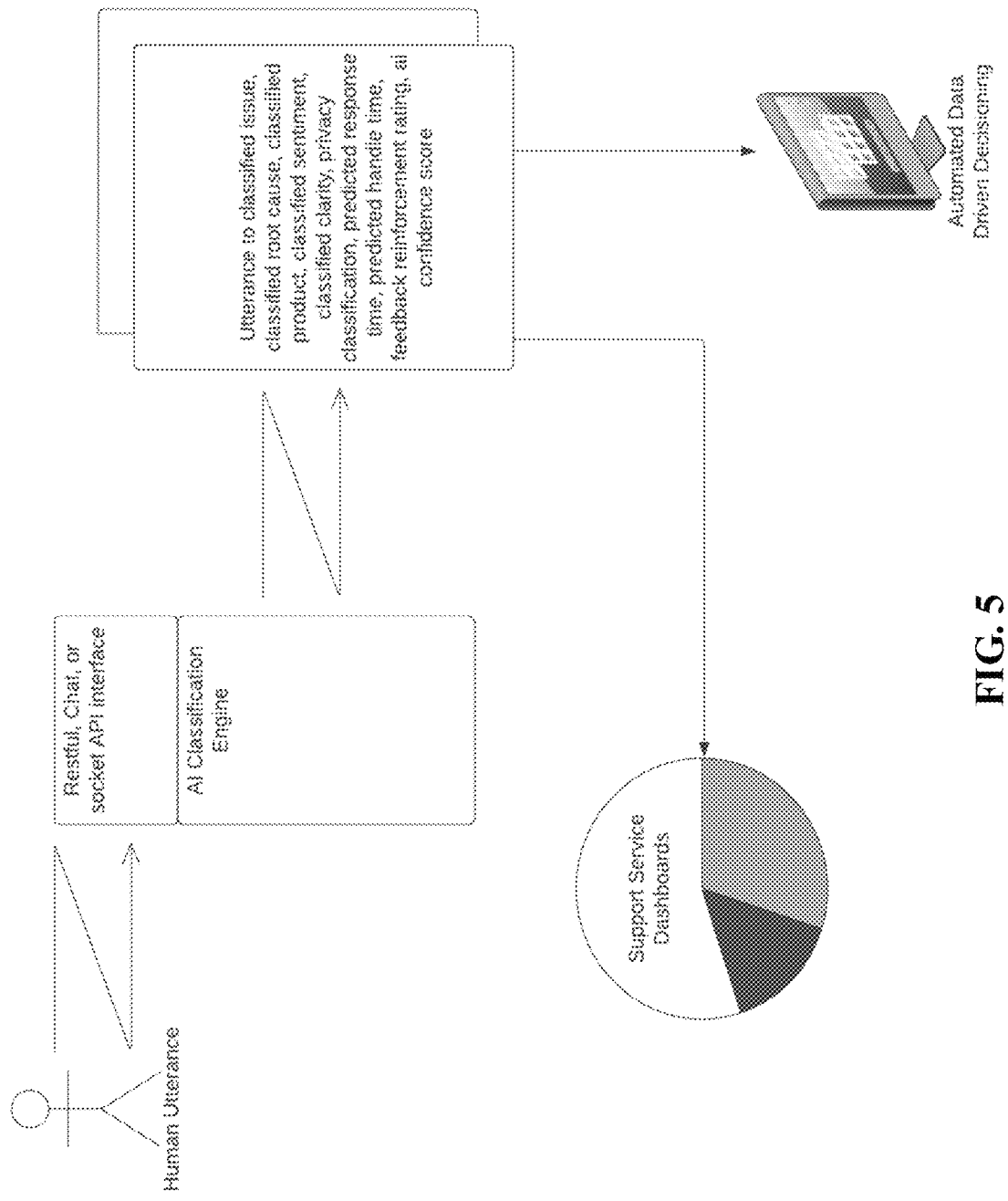
FIG. 5 is a flow diagram of an exemplary process for implementing a method for facilitating automated classification and metadata tagging of natural language data in real-time by using artificial intelligence.

FIG. 5 is a flow diagram 500 of an exemplary process for implementing a method for facilitating automated classification and metadata tagging of natural language data in real-time by using artificial intelligence. In FIG. 5, various components of an automated classification and metadata tagging solution is provided for the processing of natural language data.

The solution may be deployable as a cloud service that enables RESTful API and message bus interfaces. Interactions may be served between producers and consumers. Consistent with present disclosures, requesting consumers may submit natural language data such as, for example, a human utterance to a producer associated with the disclosed invention. The producer service may accept single as well as multi-segmented human utterances and generate appropriate responses.

As illustrated in FIG. 5, a human utterance may be received by an artificial intelligence (AI) classification engine via an interface such as, for example, a RESTful interface, a chat interface, or a socket API interface. The AI classification engine may process the human utterance to determine classified issues, classified root causes, classified products, classified sentiments, classified clarity, and classified privacy. The AI classification engine may also process the human utterance to determine predicted response times, predicted handle times, feedback reinforcement ratings, and AI confidence scores. Then, an output of the AI classification engine may be transmitted to support service dashboards. The output may be usable to facilitate automated data driven decisioning.

Accordingly, with this technology, an optimized process for facilitating automated classification and metadata tagging of natural language data in real-time by using artificial intelligence is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically classifying and tagging natural language data, the method being implemented by at least one processor, the method comprising:
    receiving, by the at least one processor via an application programming interface, at least one request that relates to at least one from among a support service and a data extraction service from at least one source, each of the at least one request including raw data in a natural language format, wherein the support service relates to at least one from among a troubleshooting, a facilitating, and a resolving of a system operation;
    converting, by the at least one processor, the raw data into at least one structured data set that is recognizable by at least one model;
    determining, by the at least one processor using the at least one model, at least one metadata output that provides contextual information for each of the at least one request based on the corresponding at least one structured data set;
    appending, by the at least one processor, each of the at least one metadata output to the corresponding at least one request in order to associate each of the at least one metadata output with the corresponding at least one request;
    determining, by the at least one processor, at least one action for each of the at least one request based on the corresponding at least one metadata output, wherein the at least one action relates to at least one process for resolving the at least one request; and
    automatically initiating, by the at least one processor, the at least one action.

2. The method of claim 1, further comprising:
    generating, by the at least one processor, documentation for each of the at least one request, the documentation including information that relates to at least one from among the at least one request, the at least one metadata output, and the at least one action;
    generating, by the at least one processor, at least one graphical representation of the documentation, the at least one graphical representation including a dashboard; and
    displaying, by the at least one processor, the at least one graphical representation via a graphical user interface.

3. The method of claim 1, wherein the at least one request includes at least one from among a service request, a search request, and an incident request from the at least one source, the at least one source including at least one from among a chat platform, a ticketing platform, and a client communication platform.

4. The method of claim 1, wherein determining the at least one metadata output further comprises:
    determining, by the at least one processor using the at least one model, at least one classification for each of the at least one request based on the corresponding at least one structured data set;
    determining, by the at least one processor using the at least one model, at least one predicted outcome for each of the at least one request based on the corresponding at least one structured data set; and
    determining, by the at least one processor using the at least one model, at least one characteristic for each of the at least one request based on the corresponding at least one structured data set.

5. The method of claim 4, wherein the at least one classification includes at least one from among an issue type classification, a root cause classification, a product classification, and a sentiment classification.

6. The method of claim 4, wherein the at least one predicted outcome includes at least one from among a predicted response time for responding to the at least one request that is curated through historical response trained data and a predicted completion time for resolving at least one issue associated with the at least one request that is curated through historical completion input trained data.

7. The method of claim 4, wherein the at least one characteristic includes at least one from among a clarity level, a privacy level, a feedback reinforcement rating, and a confidence score.

8. The method of claim 1, wherein determining the at least one action further comprises:
    determining, by the at least one processor, at least one destination for each of the at least one request based on the corresponding at least one metadata output;
    determining, by the at least one processor, an escalation factor for each of the at least one request based on the corresponding at least one metadata output and a predetermined guideline; and
    determining, by the at least one processor, the at least one action based on the at least one destination and the escalation factor.

9. The method of claim 1, wherein the at least one model includes at least one from among a machine learning model, natural language processing model, a statistical model, a mathematical model, a process model, and a data model.

10. A computing device configured to implement an execution of a method for automatically classifying and tagging natural language data, the computing device comprising:
    a processor;
    a memory; and
    a communication interface coupled to each of the processor and the memory,
    wherein the processor is configured to:

receive, via an application programming interface, at least one request that relates to at least one from among a support service and a data extraction service from at least one source, each of the at least one request including raw data in a natural language format, wherein the support service relates to at least one from among a troubleshooting, a facilitating, and a resolving of a system operation;

convert the raw data into at least one structured data set that is recognizable by at least one model;

determine, by using the at least one model, at least one metadata output that provides contextual information for each of the at least one request based on the corresponding at least one structured data set;

append each of the at least one metadata output to the corresponding at least one request in order to associate each of the at least one metadata output with the corresponding at least one request;

determine at least one action for each of the at least one request based on the corresponding at least one metadata output, wherein the at least one action relates to at least one process for resolving the at least one request; and automatically initiate the at least one action.

11. The computing device of claim 10, wherein the processor is further configured to:

generate documentation for each of the at least one request, the documentation including information that relates to at least one from among the at least one request, the at least one metadata output, and the at least one action;

generate at least one graphical representation of the documentation, the at least one graphical representation including a dashboard; and display the at least one graphical representation via a graphical user interface.

12. The computing device of claim 10, wherein the at least one request includes at least one from among a service request, a search request, and an incident request from the at least one source, the at least one source including at least one from among a chat platform, a ticketing platform, and a client communication platform.

13. The computing device of claim 10, wherein, to determine the at least one metadata output, the processor is further configured to:

determine, by using the at least one model, at least one classification for each of the at least one request based on the corresponding at least one structured data set;

determine, by using the at least one model, at least one predicted outcome for each of the at least one request based on the corresponding at least one structured data set; and determine, by using the at least one model, at least one characteristic for each of the at least one request based on the corresponding at least one structured data set.

14. The computing device of claim 13, wherein the at least one classification includes at least one from among an issue type classification, a root cause classification, a product classification, and a sentiment classification.

15. The computing device of claim 13, wherein the at least one predicted outcome includes at least one from among a predicted response time for responding to the at least one request that is curated through historical response trained data and a predicted completion time for resolving at least one issue associated with the at least one request that is curated through historical completion input trained data.

16. The computing device of claim 13, wherein the at least one characteristic includes at least one from among a clarity level, a privacy level, a feedback reinforcement rating, and a confidence score.

17. The computing device of claim 10, wherein, to determine the at least one action, the processor is further configured to:

determine at least one destination for each of the at least one request based on the corresponding at least one metadata output;

determine an escalation factor for each of the at least one request based on the corresponding at least one metadata output and a predetermined guideline; and determine the at least one action based on the at least one destination and the escalation factor.

18. The computing device of claim 10, wherein the at least one model includes at least one from among a machine learning model, natural language processing model, a statistical model, a mathematical model, a process model, and a data model.

19. A non-transitory computer readable storage medium storing instructions for automatically classifying and tagging natural language data, the storage medium comprising executable code which, when executed by a processor, causes the processor to:

receive, via an application programming interface, at least one request that relates to at least one from among a support service and a data extraction service from at least one source, each of the at least one request including raw data in a natural language format, wherein the support service relates to at least one from among a troubleshooting, a facilitating, and a resolving of a system operation;

convert the raw data into at least one structured data set that is recognizable by at least one model;

determine, by using the at least one model, at least one metadata output that provides contextual information for each of the at least one request based on the corresponding at least one structured data set;

append each of the at least one metadata output to the corresponding at least one request in order to associate each of the at least one metadata output with the corresponding at least one request;

determine at least one action for each of the at least one request based on the corresponding at least one metadata output, wherein the at least one action relates to at least one process for resolving the at least one request; and automatically initiate the at least one action.

20. The storage medium of claim 19, wherein, when executed by the processor, the executable code further causes the processor to:

generate documentation for each of the at least one request, the documentation including information that relates to at least one from among the at least one request, the at least one metadata output, and the at least one action;

generate at least one graphical representation of the documentation, the at least one graphical representation including a dashboard; and display the at least one graphical representation via a graphical user interface.

* * * * *